United States Patent [19]
Untamo

[11] 3,806,792
[45] Apr. 23, 1974

[54] PARALLEL INVERTER WITH SATURABLE REACTOR CURRENT CONTROL

[75] Inventor: Peter Pentti Untamo, Branchburg Twp., Somerset County, N.J.

[73] Assignee: Bell Telephone Laboratories, Incorporated, Murray Hill, N.J.

[22] Filed: July 16, 1973

[21] Appl. No.: 379,500

[52] U.S. Cl. .............. 321/25, 321/45 R, 323/89 R
[51] Int. Cl. ........................................ H02m 7/52
[58] Field of Search .......... 321/25, 45 R; 323/89 R; 331/113 A

[56] References Cited
UNITED STATES PATENTS

| | | | |
|---|---|---|---|
| 2,783,384 | 2/1957 | Bright et al. | 321/44 |
| 2,791,742 | 5/1957 | Karlson | 323/56 |
| 3,015,772 | 1/1962 | Rochelle | 323/56 |
| 3,045,174 | 7/1962 | LaFuze | 323/89 R |
| 3,078,380 | 2/1963 | Ingman | 321/45 R |
| 3,223,945 | 12/1965 | Damon | 331/113 A |
| 3,350,620 | 10/1967 | Barron | 321/25 X |
| 3,350,624 | 10/1967 | Annunziato et al. | 321/25 X |
| 3,467,852 | 9/1969 | Murray et al. | 321/45 R |
| 3,524,990 | 8/1970 | Bajpai et al. | 321/45 R |
| 3,629,725 | 12/1971 | Chun | 321/45 R |

Primary Examiner—William M. Shoop, Jr.
Attorney, Agent, or Firm—H. L. Logan

[57] ABSTRACT

Control of the output current of a parallel type of power inverter is achieved through the addition of a pair of diodes and saturable reactor structure having a pair of cores. Each of the cores has a pair of gate windings which are serially connected with the inverter switching devices, respectively, and poled oppositely with respect to one another. Direct current applied to the reactor structure controls the inverter output current level.

7 Claims, 4 Drawing Figures

3,806,792

PARALLEL INVERTER WITH SATURABLE REACTOR CURRENT CONTROL

BACKGROUND OF THE INVENTION

1. Field of the Invention

This invention relates to the use of saturable reactors for controlling the output currents of power inverters.

2. Description of the Prior Art

One form of parallel power inverters comprises an overdriven, push-pull, transformer-output amplifier which may include a feedback circuit to convert the amplifier into an oscillator or may be driven by an external source. Such inverters are disclosed, for example, in FIGS. 1 and 6, respectively, of U.S. Pat. No. 2,783,384, issued to R. L. Bright et al. on Feb. 26, 1957. The transistors disclosed in the patent function as switching devices and consequently any sort of devices which may be operated as switches may be used. These inverters are referred to in the art as parallel inverters because of the two alternately switched devices through which the output transformer is fed. On the other hand, they may be viewed as three-terminal-source inverters because of the three terminals connected to the primary side of the output transformer.

The use of the saturable reactors to control the current outputs of the above-described inverters has presented problems. Although the placement of a reactor in the output, or secondary, side of the transformer appears to be an obvious approach, the voltage levels encountered are frequently high enough to require reactor insulation and turns-ratio which introduce undesirable expense and interwinding capacitance. A more desirable approach is the placement of such a reactor or reactors within the inverter where the voltage levels are lower. This approach, however, apparently has not heretofore been achieved because of the necessity of having to control each of the paths feeding the output transformer.

SUMMARY OF THE INVENTION

An object of the invention is to control the output currents of so-called parallel inverters through the use of saturable reactors electrically located within the inverters.

This and other objects are achieved in accordance with the invention by adding, to a conventional parallel inverter, two diodes and saturable reactor structure having first and second cores, at least one control winding, first and second gate windings associated with the first core and third and fourth windings associated with the second core. A direct current passes through the control winding to place the cores in saturated states. The first and third gate windings are connected in series with the inverter switching devices, respectively, and poled so that a current flowing through either of the switching devices and its series-connected gate winding drives the core associated with that winding out of saturation. The second and third gate windings are connected in series with the third and first gate windings, respectively, and poled so that current flowing through either one as a result of an enabled switching device does not drive out of saturation the core associated with that gate winding. The cores are therefore alternately driven out of saturation in response to the current flowing through the alternately enabled switching devices and the first and third windings are connected in series with them.

The diodes, on the other hand, are connected in parallel with the switching devices, respectively, so that the diodes are poled for current conduction in a sense opposite that of the enabled switching devices. These diodes provide current paths for voltages induced across the second and fourth gate windings when their cores are driven back into saturation by control winding current upon the reversals of the drives on the switching devices. As will become apparent from the following discussion relating to a specific embodiment of the invention, these paths prevent breakdowns of the switching devices as a result of the voltages across the second and fourth gate windings and also permit currents to flow which result in a substantially square wave current drive to the output transformer.

The control winding direct current controls the inverter output current in a proportionate manner. The control winding direct current may be set by external means or by a feedback path responding to the inverter output current.

A feature of the present invention is that its basic elements may be used to form a prior art current-controlled inverter where this prior art inverter produces the same output current and voltage as the present inverter when the energizing DC voltage level is equal to twice that of the present inverter. The advantage of being able to use the same basic components to form two inverters having the same output characteristics but responsive to energizing voltage levels having a two-to-one ratio is believed apparent when it is remembered that popular DC voltage levels are 6, 12, 24, and 48 volts. This feature is considered in greater detail in the following discussion.

DESCRIPTION OF THE DISCLOSED EMBODIMENT

Figure 1:
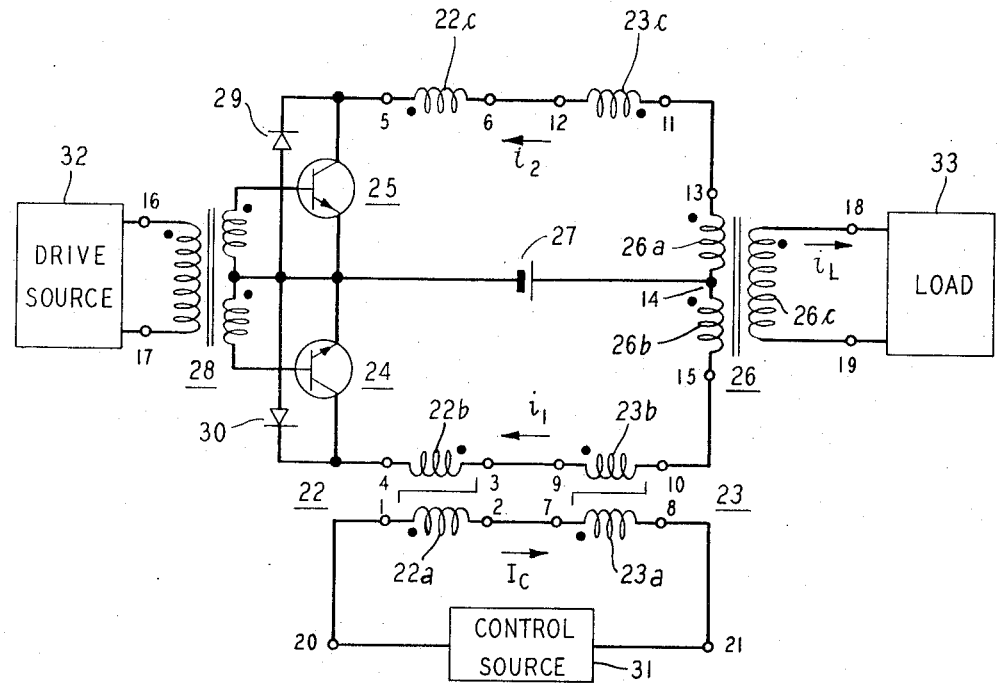
FIG. 1 is a schematic diagram of an embodiment of the invention.

The embodiment of the invention illustrated in FIG. 1 comprises input terminals 16 and 17, output terminals 18 and 19, and control input terminals 20 and 21. The embodiment also includes a saturable reactor structure comprising two saturable reactors 22 and 23. Reactor 22 has a control winding 22a with terminals 1 and 2, a gate winding 22b with terminals 3 and 4, and a gate winding 22c with terminals 5 and 6. Similarly, reactor 23 has a control winding 23a with terminals 7 and 8, a gate winding 23b with terminals 9 and 10, and a gate winding 23c with terminals 11 and 12. In order to simplify the drawing, windings 22c and 23c are shown as being somewhat removed from the rest of the reactors. It is to be understood that these windings are intimate parts of the reactors. Furthermore, it is to be understood that the various windings are poled with respect to one another in accordance with the conventional poling dots shown next to the winding terminals. In particular, currents flowing into terminals 1, 3, and 5 of reactor 22 all produce aiding effects in producing saturation in the reactor. Similarly, currents flowing into terminals 7, 9, and 11 all produce aiding effects in reactor 23.

The embodiment further includes a pair of transistors 24 and 25 having their collectors connected to terminals 4 and 5, respectively, of reactor 22. A direct-current path interconnects their emitters while direct-current paths interconnect terminals 2 and 7, terminals 3 and 9, and terminals 6 and 12, respectively, of reactors 22 and 23.

Still further, the embodiment includes an output transformer 26 having a split primary winding comprising windings 26a and 26b connected to terminals 13, 14, and 15 and a secondary winding 26c connected to output terminals 18 and 19. Terminals 13 and 15 of transformer 26 are connected to terminals 11 and 10, respectively, of reactor 23. The windings of transformer 26 are poled, as shwon by the conventional dots next to the windings, so that terminal 18 is positive when terminal 13 is positive.

The embodiment is powered by a DC source 27 connected between terminal 14 of transformer 26 and the emitters of transistors 24 and 25. Drive inputs are applied to transistors 24 and 25 by way of a transformer 28 having its primary winding connected to input terminals 16 and 17, the extremities of its split secondary winding connected to the bases of transistors 24 and 25, respectively, and the center of its secondary winding connected to the transistor emitters. Conventional poling dots are also shown next to the windings of transformer 28. The collector-to-emitter paths of transistors 25 and 24 are shunted by diodes 29 and 30, respectively, with the diodes being oppositely poled with respect to the transistors. Control energy is applied to the reactors by way of a direct-current path connected between terminal 1 of reactor 22 and control input terminal 20 and a direct-current path connected between terminal 8 of reactor 23 and control input terminal 21.

The circuit described thus far differs over that shown in FIG. 6 of the Bright et al. patent in that the present circuit includes reactors 22 and 23 and diodes 29 and 30. It is through the use of these elements that the current output of the inverter is controlled. Although the invention is illustrated in connection with the circuit of FIG. 6 of the Bright et al. patent, it is to be understood that it may be practiced with the oscillatory circuit of FIG. 1 of the Bright et al. patent by the identical addition of applicant's reactors 22 and 23 and diodes 29 and 30. In either case the transistors are overdriven so as to function as switching devices.

In the operation of the embodiment of FIG. 1, a control source 31 is connected to terminals 20 and 21, a rectangular waveform drive source 32 (or any other form of alternating-current source) is connected to terminals 16 and 17, and a load 33 is connected to terminals 18 and 19. Control source 31 causes a direct current $I_c$ to flow from terminal 20 through windings 22a and 23a to terminal 21. Direct current $I_c$ is of a sufficient magnitude to place saturable reactors 22 and 23 in saturated states. Furthermore, source 31 has a response characteristic which maintains current $I_c$ substantially constant when reactors 22 and 23 are alternately driven out of saturation in response to the action produced by the rectangular waveform input applied to terminals 16 and 17.

Figure 2:
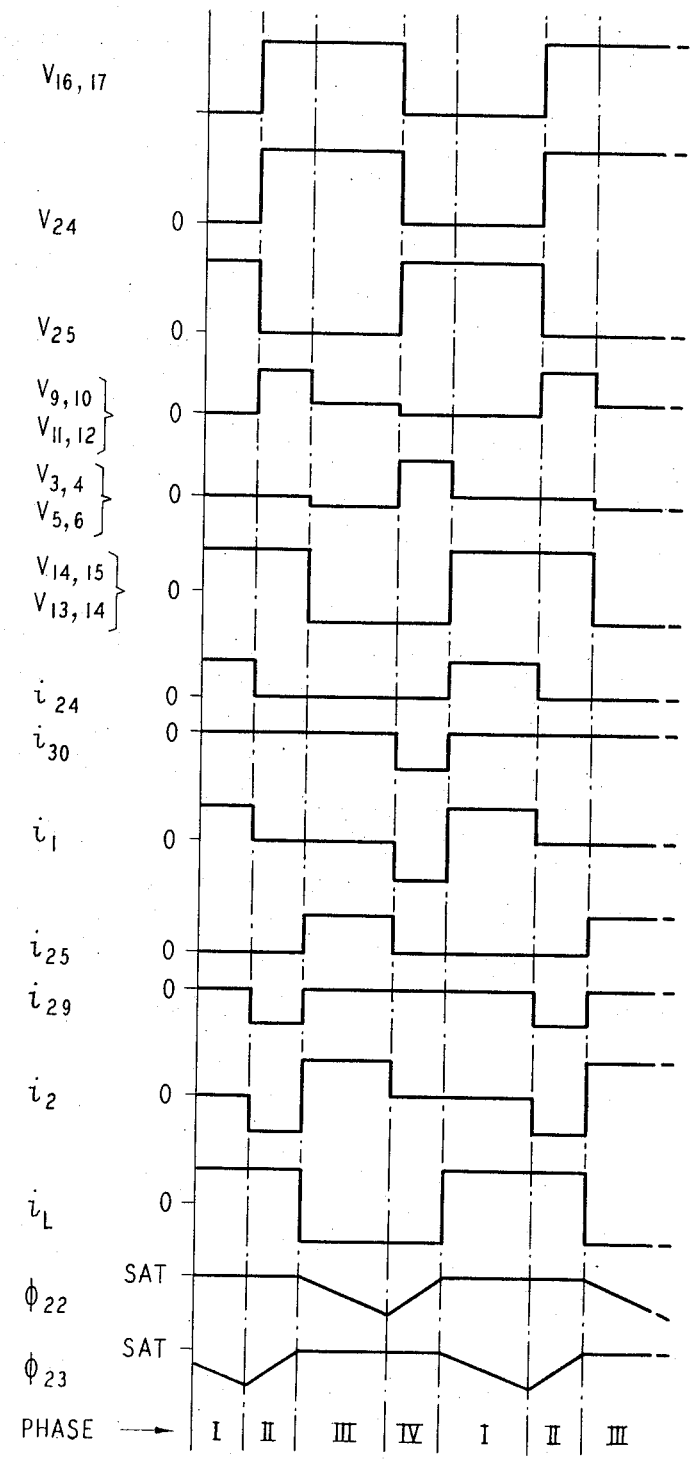
FIG. 2 is a set of waveforms useful in understanding the operation of the disclosed embodiment.

Each cycle of operation of the embodiment may be viewed as comprising four phases. As will become apparent from the following discussion, these four phases are associated with the conducting states of transistors 24 and 25 and diodes 29 and 30, respectively. FIG. 2 shows these phases in relation to various voltage and current waveforms in the embodiment for a resistive load 33.

As mentioned earlier, when the embodiment is in use, current $I_c$ flows through windings 22a and 23a while a rectangular waveform drive input is applied to terminals 16 and 17. When the drive input causes transistor 24 to be in saturation, a current $i_1$ flows from source 27 into terminal 14 and out of terminal 15 of the primary winding of transformer 26, into terminal 10 and out of terminal 9 of winding 23b, into terminal 3 and out of terminal 4 of winding 22b, and through transistor 24 to source 27. As current $i_1$ flows through winding 23b in a poling sense opposite to current $I_c$ through winding 23a, reactor 23 is driven out of saturation. Current $i_1$, however, flows through winding 22b in a direction which does not drive reactor 22 out of saturation. The expressions at this time for the circuit currents and voltages are:

$i_1 = N_{23a}/N_{23b} I_c$      $i_2 = 0$
$i_{24} = i_1$      $i_{25} = 0$
$i_{30} = 0$      $i_{29} = 0$
$V_{3,4} = 0$      $V_{5,6} = 0$
$V_{14,15} = V_{27} - V_{10,9}$      $V_{12,11} = V_{10,9}$
$i_L = N_{26b} N_{23a}/N_{26c} N_{23b} I_c$      $V_{13,14} = V_{14,15}$ where:
- $i_1$ is the current through windings 22b and 23b;
- $i_2$ is the current through windings 22c and 23b; the remaining current subscripts indicate the elements through which the associated currents flow;
- $N$ is the number of turns of the winding identified by its subscript;
- the voltage subscripts indicate the elements across or the termiminals between which the voltages appear;
- and the voltage drop across the conducting transistor is considered negligible compared with other voltages in the circuit.

These voltages and currents, the drive input applied to terminals 16 and 17, and the flux of reactors 22 and 23 are represented by the idealized waveforms of FIG. 2 within the regions identified as PHASE I. Also shown in FIG. 2 is load current $i_L$ which flows from terminal 18 through load 33. Because of the poling of the windings of transformer 26, this current, as shown, has a positive value during PHASE I.

When the drive input changes so as to turn off transistor 24 and turn on transistor 25, current $i_1$ ceases and the flux of reactor 23 increases — as a result of current $I_c$ — until saturation is again reached. This flux change in reactor 23 produces voltages across windings 23b and 23c whereby terminals 9 and 11 are positive with respect to terminals 10 and 12, respectively. These voltages exceed that of source 27. The voltage across 23b cannot, however, produce any current flow while that across winding 23c can produce a current flow through diode 29. The expressions for the voltages and currents at this time are:

$$i_1 = 0$$
$$i_{24} = 0$$
$$i_{30} = 0$$
$$V_{3,4} = 0$$
$$V_{9,10} = V_{11,12}$$
$$V_{14,15} = V_{13,14}$$

$$-i_2 = N_{23a}/N_{23c} \, I_c$$
$$i_{25} = 0$$
$$i_{29} = -i_2$$
$$V_{5,6} = 0$$
$$V_{13,14} = V_{11,12} - V_{27}$$
$$i_L = N_{26a} \, N_{23a}/N_{26c} \, N_{23c} \, I_c$$

The voltages and currents, the drive input applied to terminals 16 and 17, and the flux of reactors 22 and 23 are represented by the idealized waveforms of FIG. 2 within the regions identified as PHASE II. It should be noted that load current $i_L$ has a positive value during PHASE II.

The voltage $V_{11,12}$ produced by the charging flux in reactor 23 diminishes as the reactor approaches saturation. At some point in this transient, this voltage falls to a level whereby current $-i_2$ reverses and flows through forward-biased transistor 25. Current $i_2$ now flows through winding 22c in a poling sense opposite to current $I_c$ through winding 22a. Reactor 22 is thereby driven out of saturation. The current through winding 23c, however, does not drive reactor 23 out of saturation. The voltage and current expressions at this time are:

$$i_1 = 0$$
$$i_{24} = 0$$
$$i_{30} = 0$$
$$V_{9,10} = 0$$
$$V_{3,4} = V_{5,6}$$
$$V_{15,14} = V_{14,13}$$

$$i_2 = N_{22a}/N_{22c} \, I_c$$
$$i_{25} = i_2$$
$$i_{29} = 0$$
$$V_{11,12} = 0$$
$$V_{14,13} = V_{27} - V_{6,5}$$
$$i_L = -N_{26a} \, N_{22a}/N_{26c} \, N_{22c} \, I_c$$

This is PHASE III which is also illustrated in FIG. 2. Load current $i_2$ now has a negative value.

When the drive on the transistors again reverses so that transistor 24 is turned on while transistor 25 is turned off, current $i_2$ ceases and the flux of reactor 22 increases — as a result of current $I_c$ — until saturation is again reached. This flux change in reactor 22 produces voltages across windings 22b and 22c whereby terminals 3 and 5 are positive with respect to terminals 4 and 6, respectively. These voltages exceed that of source 27. The voltage across 22c cannot, however, produce any current flow while that across 22b can produce a current flow through diode 30. The voltage and current expressions at this time are:

$$-i_1 = N_{22a}/N_{22b} \, I_c$$
$$i_{24} = 0$$
$$i_{30} = -i_1$$
$$V_{9,10} = 0$$
$$V_{15,14} = V_{3,4} - V_{27}$$
$$i_L = -N_{26b} \, N_{22a}/N_{26c} \, N_{22b} \, I_c$$

$$i_2 = 0$$
$$i_{25} = 0$$
$$i_{29} = 0$$
$$V_{11,12} = 0$$
$$V_{5,6} = V_{3,4}$$
$$V_{14,13} = V_{15,14}$$

This is PHASE IV and is also shown in FIG. 2. It should be noted that load current $i_L$ is also negative during PHASE IV The voltage $V_{3,4}$ diminishes as reactor 22 goes into saturation and a point is reached whereat current $i_1$ reverses and the operation of the circuit reenters PHASE I, thus completing a cycle of operation.

From the above explanation and expressions it is believed apparent that the actual current flowing through the primary winding of transformer 26 has the same polarity for PHASES I and II. Similarly, the actual current flowing through the primary winding of transformer 26 has the same polarity for PHASES III and IV. This latter polarity is, however, opposite to that for PHASES I and II. The output current has a rectangular waveform. This current waveform remains rectangular in shape even though load 33 is not purely resistive. When load 33 is not purely resistive, the voltage waveforms of FIG. 2 change in accordance with well-known voltage-current relationships as a function of impedance.

From the above expressions, it is believed apparent that the load current $i_L$ is proportional to current $I_c$ from control source 31. Closed-loop regulation of the output current is achievable by making control source 31 responsive to the load current $i_L$ so that $I_c$ is proportionate to $i_L$. Source 31 may comprise, for example, the combination of feedback control 17, current droop circuit 35, and current monitor circuit 30 as disclosed in U.S. Pat. No. 3,624,405, issued Nov. 30, 1971 to J.D. Bishop et al. In such a case, embodiments of the present invention, like that in the patent, function as a constant-current inverters with current-balance-responsive feedback.

Figure 3:
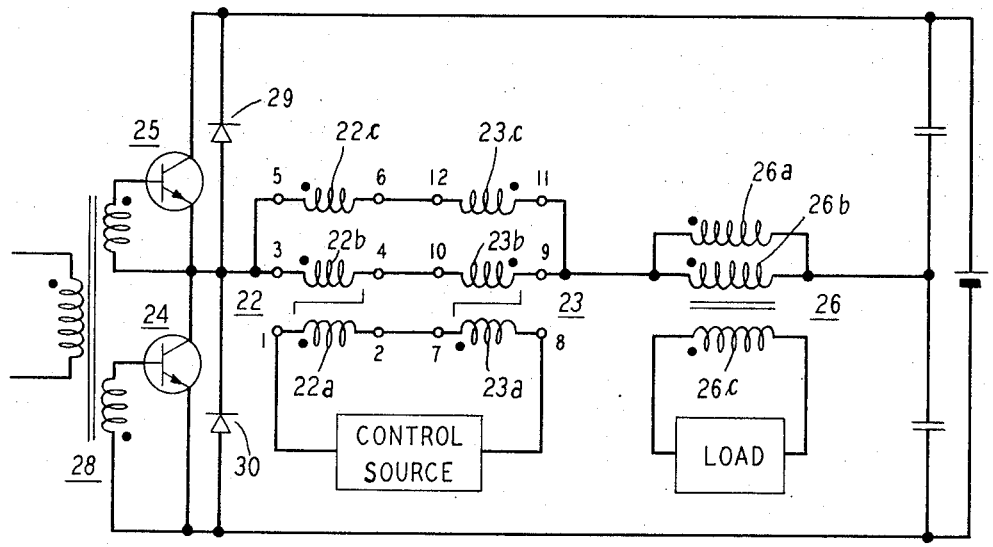
FIG. 3 is a schematic diagram of a prior art inverter showing therein the use of the principal components of the disclosed embodiment of the invention.

As mentioned earlier herein, one of the features of the present invention is that its basic elements may be used to form a prior art current-controlled inverter where this prior art inverter produces the same output current and voltage as the present inverter when its energizing direct-current voltage level is equal to twice that of the voltage from source 27 of FIG. 2. Such a prior art inverter using the basic components of FIG. 1 is shown in FIG. 3. This inverter is that disclosed and described in the previously-mentioned Bishop et al. patent with the Bishop et al. saturable reactor 15 and output transformer 26 being replaced by the present reactors and output transformer, respectively, as shown. The operation of FIG. 3 may be appreciated by referring to the Bishop et al. patent.

The voltage and current stresses on like elements in FIGS. 1 and 3 are the same with the exception that the rms currents in the reactors and the output transformer of FIG. 3 are slightly less than those in the reactors and the output transformer of FIG. 1. The advantage of being able to use the same basic components to form two inverters having the same output characteristics but responsive to energizing voltage levels having a two-to-one ratio is believed apparent when it is considered that popular direct-current voltage levels are 6, 12, 24, and 48 volts.

Figure 4:
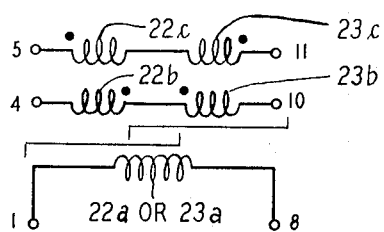
FIG. 4 is a diagrammatic illustration as to how the two saturable reactors of FIGS. 1 and 3 may be combined into a single unit.

Finally, saturable reactors 22 and 23 need not be single units but may be combined into one unit. One combination based upon the teachings of *Control Engineer's Handbook*, edited by J. G. Truxal (McGraw-Hill 1958), pp. 7–26, is disclosed in FIG. 4.

What is claimed is:

1. A parallel inverter having a transformer-coupled output and a pair of switching devices which are alternately enabled, said inverter characterized in that:

a pair of diodes are connected across the output terminals of said switching devices, respectively, and poled oppositely to the direction of current flow through said devices when said devices are enabled; and saturable reactor means is connected in said inverter, said means having a pair of cores, at least one control winding with a current therethrough which places said cores in saturated states, first and second gate windings associated with one of said cores and third and fourth gate windings associated with the other of said cores with said first and third gate windings connected in series with said switching devices, respectively, and poled so that current flowing through either of said devices and its series-connected gate winding drives out of saturation the core associated with that winding, and, furthermore, with said second and fourth gate windings connected in series with said third and first gate windings, respectively, and poled so that neither of the cores is driven out of saturation in response to said current from said devices flowing through either of said second and fourth windings.

2. A parallel inverter having a transformer-coupled output and first and second switching devices which are alternately enabled, said inverter characterized in that:

a pair of diodes are connected across the output terminals of said switching devices, respectively, and poled oppositely to the direction of current flow through said devices when said devices are enabled; and saturable reactor means is connected in said inverter, said means having first and second cores, at least one control winding with a current therethrough which places said cores in saturated states, first and second gate windings associated with said first core and third and fourth gate windings associated with said second core with said first gate winding and said third gate winding connected in series with said first device and poled so that current flowing through said first device and said windings connected in series therewith drives only said first core out of saturation and, furthermore, with said second gate winding and said fourth gate winding connected in series with said second device and poled so that current flowing through said second device and said windings connected in series therewith drives only said second core out of saturation.

3. A parallel inverter having a transformer-coupled output and a pair of switching devices which are alternately enabled, said inverter characterized in that:

a pair of diodes are connected across the output terminals of said switching devices, respectively, and poled oppositely to the direction of current flow through said devices when said devices are enabled;

first and second saturable reactors are connected in said inverter, each of said reactors having a core, a control winding and a pair of gate windings, with the first reactor gate windings connected in series with said devices, respectively, and poled oppositely with respect to one another with reference to said devices, and, furthermore, with said second reactor gate windings connected in series with said first reactor gate windings, respectively, and poled oppositely with respect to one another with reference to said devices; and control current means is connected to said control windings to apply a current to drive said cores into saturation, said control windings being poled so that current through one of said devices and the gate windings connected in series therewith drives only one of said reactors out of saturation, and current through the other of said devices and the gate windings in series therewith drives the other of said reactors out of saturation.

4. An inverter comprising:

a push-pull circuit comprising a first path including a switching device which, when enabled, permits direct current to flow through one-half of a primary winding on an output transformer and a second path including a switching device which, when enabled, permits direct current to flow through the other half of said output transformer;

a first diode connected across a first of said devices and poled for easy current flow opposite to the direct current through said first device when enabled;

a second diode connected across the other of said devices and poled for easy current flow opposite to the direct current through said other device when enabled; and saturable reactor means having a pair of cores, at least one control winding with a current therethrough which places said cores in saturated states, first and second gate windings associated with one of said cores and first and second gate windings associated with the other of said cores, with said first gate windings connected in series in said paths, respectively, and poled so that current flowing through either of said devices and its series-connected first gate winding drives out of saturation the core associated with that winding, and, furthermore, with said second gate winding of each of said cores connected in said paths in series with said first gate winding of the other of said cores and poled so that its core is not driven out of saturation in response to said current flowing through the first gate winding to which it is series connected.

5. An inverter comprising:

first and second switching devices, each of which when enabled provides a unidirectional current conduction path between first and second terminals associated with that device;

a first diode connected between said terminals of said first device and poled for easy current flow in a direction between said first device terminals which is opposite to that permissible through said first device when enabled;

a second diode connected between said terminals of said second device and poled for easy current flow in a direction between said second device terminals which is opposite to that permissible through said second device when enabled;

an output transformer having a centertapped primary winding;

a source of direct current connected between the center tap of said primary winding and said first terminals of said devices, said source being poled for easy current flow through the paths provided by said devices when said devices are enabled;

saturable reactor means having first and second cores, at least one control winding with a current therethrough which places said cores in saturated states, first and second gate windings associated with said first core and first and second gate windings associated with said second core;

means connecting said first gate winding of said first core and said second gate winding of said second core in series and between said second terminal of said first device and one extremity of said primary winding with said gate windings poled so that current flowing through said first device and said gate windings connected in series therewith drives only said first core out of saturation; and means connecting said second gate winding of said first core and said first gate winding of said second core in series and between said second terminal of said second device and the other extremity of said primary winding with said gate windings poled so that current flowing through said second device and said gate windings connected in series therewith drives only said second core out of saturation.

6. An inverter comprising:
a push-pull transistor amplifier having paths connecting the collectors of a pair of like transistors to the extremities, respectively, of the primary winding of an outout transformer;
a first diode connected between the collector and emitter of a first of said transistors and poled oppositely with respect to the base-to-emitter junction of said first transistor;
a second diode connected between the collector and emitter of the other of said transistors and poled oppositely with respect to the base-to-emitter junction of said other transistor;
saturable reactor means having a pair of cores, at least one control winding, first and second gate windings associated with one of said cores and first and second gate windings associated with the other of said cores;
means connected to said control winding to cause a current to flow which places said cores in saturated states;
means connecting said first gate windings in series in said paths, respectively, and poled so that current flowing through either of said transistors and its series-connected first gate winding drives out of saturation the core associated with that winding, and, furthermore, with said second gate winding of each of said cores connected in said paths in series with said first gate winding of the other of said cores and poled so that its core is not driven out of saturation in response to said current flowing through the first gate winding to which it is series-connected.

7. An inverter comprising:
a push-pull transistor amplifier having paths connecting the collectors of a pair of like transistors to the extremities, respectively, of the primary winding of an output transformer;
a first diode connected between the collector and emitter of a first of said transistors and poled oppositely with respect to the base-to-emitter junction of said first transistor;
a second diode connected between the collector and emitter of the other of said transistors and poled oppositely with respect to the base-to-emitter junction of said other transistor;
first and second saturable reactors each having a core, a control winding, and a pair of gate windings;
means connecting said first reactor gate windings in series with said paths, respectively, with said first reactor gate windings poled oppositely with respect to one another with reference to said transistors;
means connecting said second reactor gate windings in series with said paths, respectively, with said second reactor gate windings poled oppositely with respect to one another with reference to said transistors; and
control current means connected to said control windings to apply a current to drive said cores into saturation, said control windings being poled so that current through one of said transistors and the gate windings connected in series therewith drives only one of said reactors out of saturation, and the current through the other of said transistors and the gate windings in series therewith drives the other of said reactors out of saturation.

* * * * *